(12) United States Patent
Richter et al.

(10) Patent No.: US 10,821,356 B2
(45) Date of Patent: Nov. 3, 2020

(54) SYSTEM FOR CONTROLLING A GAMING DEVICE CONSOLE

(71) Applicants: Wolfgang Richter, Vancouver (CA); Faranak Zadeh, Vancouver (CA)

(72) Inventors: Wolfgang Richter, Vancouver (CA); Faranak Zadeh, Vancouver (CA)

(73) Assignee: EPIC Semiconductors, Inc., Vancouver, BC (CA)

( * ) Notice: Subject to any disclaimer, the term of this patent is extended or adjusted under 35 U.S.C. 154(b) by 0 days.

(21) Appl. No.: 16/452,810

(22) Filed: Jun. 26, 2019

(65) Prior Publication Data

US 2020/0001175 A1    Jan. 2, 2020

Related U.S. Application Data

(60) Provisional application No. 62/689,845, filed on Jun. 26, 2018.

(51) Int. Cl.
| | |
|---|---|
| *A63F 13/24* | (2014.01) |
| *A63F 13/23* | (2014.01) |
| *A63F 13/215* | (2014.01) |
| *A63F 13/85* | (2014.01) |

(52) U.S. Cl.
CPC ........... *A63F 13/24* (2014.09); *A63F 13/215* (2014.09); *A63F 13/23* (2014.09); *A63F 13/85* (2014.09); *A63F 2300/1025* (2013.01); *A63F 2300/1043* (2013.01); *A63F 2300/1081* (2013.01)

(58) Field of Classification Search
USPC .......................................................... 463/25
See application file for complete search history.

(56) References Cited

U.S. PATENT DOCUMENTS

| | | | |
|---|---|---|---|
| 6,570,569 B1 * | 5/2003 | Tsukamoto | A63F 13/10 345/473 |
| 8,052,527 B2 * | 11/2011 | Kawase | A63F 13/5378 463/31 |
| 2008/0227543 A1 * | 9/2008 | Kawase | A63F 13/10 463/31 |
| 2013/0225295 A1 * | 8/2013 | Lee | A63F 13/428 463/37 |

* cited by examiner

*Primary Examiner* — Pierre E Elisca

(57) ABSTRACT

Disclosed is a system operably connected to a packaging body for controlling a game device console. The system includes a hub unit coupled to the gaming device console and an electronic circuitry communicating with the hub unit. The hub unit includes generator, first convertor, a first electrode, a first switching unit, a first detection unit and a hub controller. The electronic circuitry includes a second electrode, a floating electrode, a second converter, a buffer and a second detection unit for detecting change in electric-field percentage value for playing a game on the gaming device console. The hub controller receives the unique command for a specified electric-field percentage value. Further, the hub controller facilitates in selecting the right game move for playing a game on the gaming device console.

10 Claims, 3 Drawing Sheets

SYSTEM FOR CONTROLLING A GAMING DEVICE CONSOLE

CROSS-REFERENCE TO RELATED APPLICATION

This application claims priority to a U.S. Provisional Application No. 62/689,845 filed on Jun. 26, 2018, the entire contents of which are incorporated herein by references in its entirety.

BACKGROUND OF THE INVENTION

1. Field of the Invention

The present invention generally relates to a video game controller, and more particularly relates to a system operably connected to packages for controlling a gaming device console.

2. Description of Related Art

One way of playing video games involves a video game system including a television with speakers, a video game console, and a video game controller. The video game console includes computer software and computer hardware for operating a video game. The console is communicatively coupled to the television and speakers to present the video game so that the player can hear and see the video game. The console is also communicatively coupled to a video game controller with numerous input actuators that the player uses to interact with and control the presented video game.

Conventional controllers for most game consoles are intended to be held and operated by the user using both hands. A conventional controller will generally comprise a hard outer case with a plurality of controls mounted about the controller. Typically, the controller includes buttons, analogue control sticks, batteries, bumpers, and triggers.

Products are sold in attractive packages to attract customers and protect the contents. After the product is consumed the package is no longer of use. While it's apparent to recycle packages, too many of them land in the waste to create a burden for the environment. Some of the countries have now recycling machine where one is paid on recycling the plastic bottles.

Therefore, there is a need to come up with a system that provide a playful engagement of users to responsible recycle packages and create a new kind of social awarding. Further, the system should be able to use packages as game controllers e.g. for social media entertainment in combination with smart TVs, smart devices, game consoles, and other electronic devices. Furthermore, the system should award redeemable points if the packages get recycled.

SUMMARY OF THE INVENTION

In accordance with teachings of the present invention, a system operably connected to a packaging body for controlling a gaming device console is provided.

An object of the present invention is to provide a system with a hub unit coupled to the gaming device console and an electronic circuitry communicating with the hub unit. The hub unit includes generator, first convertor, a first electrode, a first switching unit, a first detection unit and a hub controller.

The electronic circuitry includes a second electrode, a floating electrode, a second converter, a buffer and a second detection unit for detecting change in electric-field percentage value for playing a game on the gaming device console. The hub controller receives the unique command for a specified electric-field percentage value. Further, the hub controller facilitates in selecting the right game move for playing a game on the gaming device console.

Another object of the present invention is to provide the system wherein the hub controller registers users associated with the packaging body. Further, the hub controller stores redeemable points and further allot the redeemable points to registered users redeemable on recycling the packaging body.

Another object of the present invention is to provide the system with the hub controller to identify the registered user associated with the packaging body. Further, the hub controller transfers the redeemable points between two registered users.

Another object of the present invention is to provide the system wherein the electronic circuitry further includes a modulation unit for modulating the identification-information with the alternating electric field. Further, transmitting the modulated identification-information to the hub controller.

DETAILED DESCRIPTION OF DRAWINGS

Figure 1:
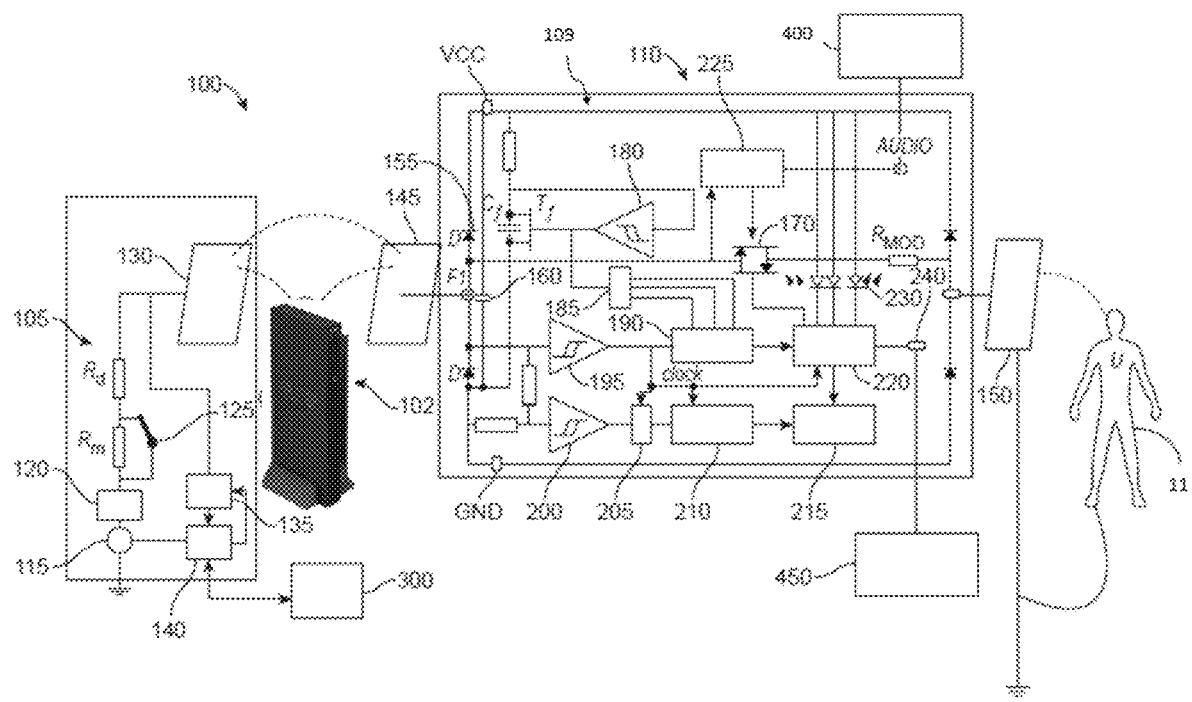
FIG. 1 illustrates a schematic diagram of a system for interacting with a gaming device console in accordance with a preferred embodiment of the present invention.

While this technology is illustrated and described in a preferred embodiment, a system operably connected to a packaging body for controlling gaming device console may be produced in many different configurations, forms and materials. There is depicted in the drawings, and will herein be described in detail, as a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the technology described herein.

FIG. 1 illustrates a schematic diagram of a system 100 operably connected to a packaging body 110 for controlling a gaming device console 102 in accordance with a preferred embodiment of the present invention. The system 100 includes a hub unit 105 coupled to the gaming device console 102 to communicate with the packaging body 110, and an electronic circuitry 109 operably connected to the packaging body 110.

Examples of gaming device console 102 includes but not limited to PS4, PS3, Xbox, computer, a smart device and other similar interacting devices requiring a game controller. Used herein the electronic circuitry 109 may be printed as a printed-electronic (PE) on paper, foils or other material like plastic polymers. The printed electronic (PE) may be operated as a hybrid-circuit in combination with conductive traces/surfaces/liquids/human skin. The electronic circuitry 109 may also be embedded in a single chip or in a printed decal or on a flexible polymer foil.

The hub unit 105 includes a generator 115, a first converter 120, a first switching unit 125, a first electrode 130, a first detection unit 135, and a hub controller 140. The generator 115 receives DC power from a DC source for generating low level AC power. In an exemplary embodiment, the DC source is from the gaming device console 102.

The first converter 120 shifts the low level AC power received from the generator 115 to high level AC power. Examples of the generator 115 include but not limited to an oscillator, a thermoelectric generator, and electromagnetic coils. Example of the first converter 120 may be a rectifier, inductor, resonator, cascade, diode bridges, transformer, and level shifter.

The first electrode 130 is connected to the first converter 120 for emitting an alternating electric field of resonating frequency. Example of the first electrode 130 includes but not limited to a conductive surface or a conductive thread. The first switching unit 125 is operative to transfer the AC power generated from the generator 115 to the first electrode 130.

The first switching unit 125 is connected to a resistance Rm and a resistance Rd to provide a high output impedance to cease the current flow from the generator 115 to the first electrode 130 when the first switching unit 125 is open. The current flow from the generator 115 to the first electrode 130 is bypassed from the resistance Rm when the first switching unit 125 is closed. The current flow then modulates the electric field with data (e.g. commands).

The first detection unit 135 detects a change in alternating electric-field across the first electrode 130. The hub controller 140 communicates gesture commands from a user 11 to the gaming device console 102. The hub controller 140 may be a finite state machine which may be implemented as hardware or software running on a processing unit or combinations of the two. Examples of the processing unit are micro-controller, silicon-on-chip, and Field programmable gate array.

The electronic circuitry 109 includes a second electrode 145, a floating electrode 150, a second converter 155, a buffer 160, and a second detection unit 165. The second electrode 145 receives the alternating electric field emitted from the first electrode 130. The floating electrode 150 floats the alternating electric field to the ground for forming a closed electric circuit with at least one of the gaming device console 102 and the hub unit 105. Examples of the second electrode 145 and the floating electrode 150 include but not limited to any conductive surface.

The second converter 155 connected to the second electrode 145 to convert the received alternating electric field into the DC energy. Example of the second converter 155 may be a rectifier, inductor, resonator, cascade, diode bridges, transformer, and level shifter. The buffer 160 configured to store the DC energy received from the second converter 155. Examples of the buffer 160 include but not limited to capacitor, silicon battery, gold cap or accumulator.

The second detection unit 165 measures the variation in the alternating electric field over the second electrode caused by touch or gestures around the packaging body 110. Further, the second detection unit 165 generates a unique command every time on detecting a different electric-field percentage value for playing a game on the gaming device console 102.

The gestures or touch may be from any body part of the human, animal or plant. Each gesture or touch may correspond to a new game move. For example, while playing a soccer game, clock-wise rotation with single finger generates a tackle command, clock-wise rotation with double finger generates a shoot command, clock-wise rotation with three fingers generates a header command, anti-clockwise rotation with single finger generates a bi-cycle kick, anti-clock wise rotation with double finger generates an overhead kick etc. Thus, multiple commands are generated through gestures.

The hub controller 140 receives the unique command for a specified electric-field percentage value. Further, the hub controller 140 facilitates in selecting the right game for playing a game on the gaming device console. Examples of packaging body 110 include but not limited to plastic containers, flower pot, remotes, bottles, drums, any physical objects.

The package can be one of any product, where the invention is attached for marketing purposes e.g. for a brand. The electronic circuitry 109 receive commands from the hub unit 105 to display information on a communication device 300. Examples of the communication device 300 include but not limited to LED, LCD, OLED or e-link displays (or any other kind of visual feedback).

The second detection unit 165 includes a first Schmitt trigger 180, a selector 185, a counter 190, a second Schmitt trigger 195 and an interpreter 215. The first Schmitt trigger 180 configured to generate a pulse interval signal related to the variation in the alternating electric field across the second electrode 145. The second Schmitt trigger 195 configured to generate a clock signal on receiving AC power from the second electrode 145. The counter 190 configured to receive the pulse interval signal and the clock signal for generating a counter-value of the alternating electric field.

The selector 185 provides three selection-input to the counter 190. The selector 185 provides a first selection-input to Clear/open the counter 190 to count the pulses received from the second Schmitt trigger 195, after receiving the first pulse from the first Schmitt trigger 180. The selector 185 provides a second selection-input to stop the counting and latch the count result, after receiving the second pulse from the first Schmitt trigger 180.

The selector 185 provides a third selection-input to compare the previous-count-value and the present-count-value, after receiving the second pulse from the second Schmitt trigger 195. The interpreter 215 interprets the counter-value into electric-field level percentage value indicating the identification-information of the electronic circuitry 109.

In another preferred embodiment of the present invention, the electronic circuitry 109 further includes a modulation unit 170 for modulating the identification-information with the alternating electric field, and further transmits the modulated identification-information to the hub controller 140.

The electronic circuitry 109 further includes a microphone 400 to receive audible commands or acoustic feedback from the user 11. The microphone 400 processes audio or sounds bi-directionally. The microphone 400 may further be connected to a sound transducer such as piezo, MEMS, electromagnetic membranes etc. The packaging body 110 then itself act as an acoustic resonator i.e. resonating audio signals over the packaging body 110.

Figure 2:
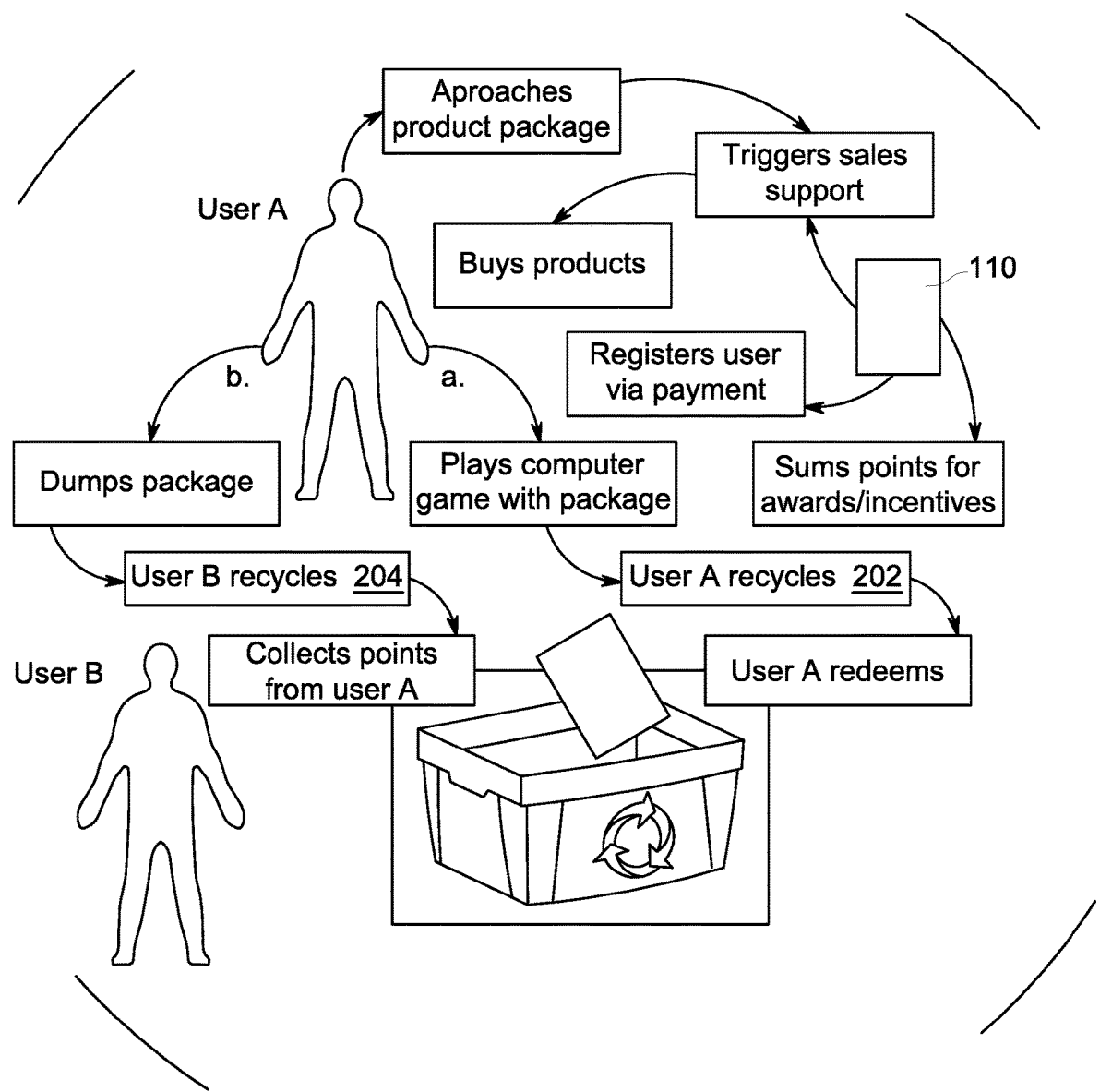
FIG. 2 illustrates a flow diagram of a process of motivating recycling of containers using the system in accordance with an exemplary embodiment of the present invention.

FIG. 2 illustrates a flow diagram of a process of motivating recycling of packaging body 110 using the system in accordance with an exemplary embodiment of the present invention. User A approaches to purchase a packaging body 110 containing the electronic circuitry (109 shown in FIG. 1). The identity of the user A is registered via the hub unit (105, shown in FIG. 1). The hub controller (140 shown in FIG. 1) awards points to the user A redeemable upon recycling. The points are redeemable through a recycling machine having a hub unit (105, shown in FIG. 1).

The user A plays game on the gaming device console using the packaging body 110 as a controller. Later, the user A either recycles 202 or dumps 204 the packaging body 110. Upon recycling the packaging body 110, the User A gets to redeem the points. It would be readily apparent to those skilled in the art that points may be redeemed in various ways such as coupons, cashback etc. without deviating from the scope of the present invention.

Alternatively, upon dumping the packaging body 110, a User B registers and recycles the packaging body 110. The electronic circuitry then transfers the redeemable points of User A to the User B. Thus the system encourages the recycling of packaging body and helps in removal of wastes.

Figure 3:
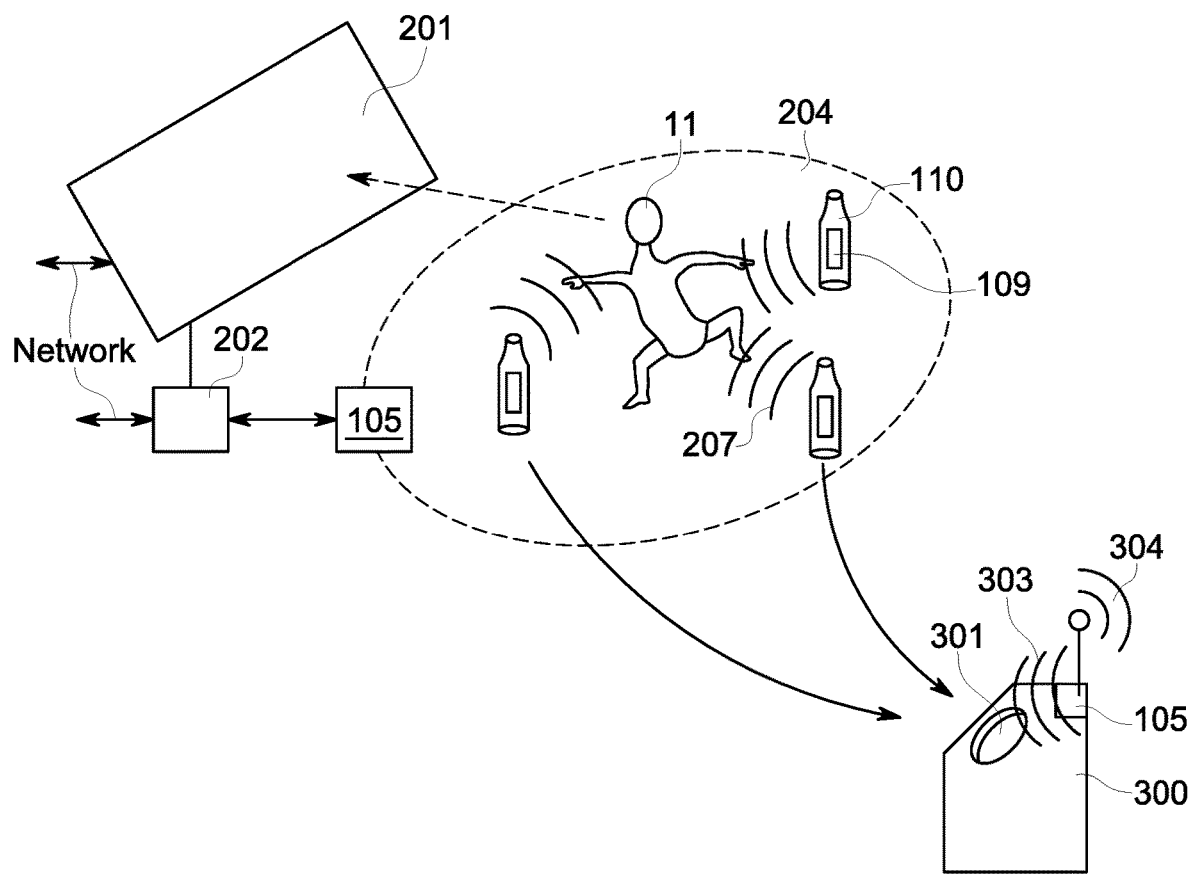
FIG. 3 illustrates a schematic diagram of a system attached to a packaging body recognized by a smart recycling container in accordance with another exemplary embodiment of the present invention.

FIG. 3 illustrates a schematic diagram of a system 100 attached to a packaging body 110 recognized by a smart recycling container 300 in accordance with another exemplary embodiment of the present invention. It would be readily apparent to those skilled in the art that multiple The hub unit 105 is operably connected to the smart recycling container 300 for identifying the packaging body 110 and the user 11.

The smart recycling container 300 includes a gate 301 and a bi-directional communication unit 304. The hub unit 105 communicates with the packaging body 110 containing the electronic circuitry 109 over the electric field 303. The hub unit (105 shown in FIG. 1) detects and scans the packaging body 110 contactless.

The gate 301 opens only on detecting the packaging body 110. Thus, the smart recycling container 300 may be used to award redeemable points to the user 11 recycling the packaging body 110. The bi-directional communication unit 304 (e.g. internet, Wi-Fi, NFC, Bluetooth, CDMA, GSM etc.) wirelessly communicates the data over the communication network.

The user 11 uses the packaging body 110 as a controller to play a game device 202 through the hub unit 105 on the display unit 201. The hub unit 105 identifies the changes in the impedance 207 caused by the user 11 and the packaging product 110. The electronic circuitry 109 and the hub unit 105 creates a synthetic aura 204 (alternating electric field environment), where the user 11 movements/actions are identified as gaming moves by the hub unit 105 to play the game device 202.

The present invention offers various advantages such as a new way for brands to promote their products and getting a "green touch" in cross-marketing as well as in social and environmental engagement. Instead of working with penalties the system counts on incentives for recycling plastic packages, bottles, and containers.

As real-world social games are extremely popular, it is apparent that the invention would find great interest from consumers, brands, and communities, while it reduces waste at the same time. To achieve this, it is necessary to make a package interactive, equipped with sensing features and connectable to digital circuits and free from battery and RFID's.

The sensing features includes movements of the package, and/or the user (including gestures and voice/sound commands) in front of an electronic game, performed by game consoles, computers, smart devices, or networks. Recycling stations (e.g. street containers) automatically identify the packages and the user when he/she inserts the package, the user gets points and/or other incentives.

In a variation, if someone finds an e.g. dumped plastic bottle (equipped with the invention) and recycles it, he/she gets all the points from the person who littered. To achieve this, product packages are assigned to buyers at the point of sale. Furthermore, the invention also provides real-time inventory for shops, warehouses, and recycling stations—turns products into augmented sales automats and prevents counterfeiting and shoplifting.

In the foregoing description, it will be readily appreciated by those skilled in the art that modifications may be made to the invention without departing from the concepts disclosed herein. Such modifications are to be considered as included in the following claims, unless the claims by their language expressly state otherwise.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, where this document refers to technologies that would be apparent or known to one of ordinary skill in the art, such technologies encompass those apparent or known to the skilled artisan now or at any time in the future. Furthermore, the use of plurals can also refer to the singular, including without limitation when a term refers to one or more of a particular item; likewise, the use of a singular term can also include the plural, unless the context dictates otherwise.

The presence of broadening words and phrases such as "one or more," "at least," "but not limited to" or other like phrases in some instances shall not be read to mean that the narrower case is intended or required in instances where such broadening phrases may be absent. Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

Although the disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosure, whether or not such embodiments are described and whether or not such features are presented as being a part of a described embodiment. Thus, the breadth and scope of the present invention should not be limited by any of the above-described exemplary embodiments.

The invention claimed is:

1. A system operably connected to a packaging body for controlling a gaming device console, the system comprising:
   a hub device coupled to the gaming device console for communicating with the packaging body, the hub comprising:
      a generator to receive DC power from a DC source for generating low level AC power;
      a first convertor to shift the low level AC power received from the generator to high level AC power;
      a first electrode connected to the first convertor for emitting an alternating electric field of resonating frequency;
      a first switching unit operative to transfer the AC power generated from the generator to the first electrode;
      a first detection unit to detect a change in alternating electric field across the first electrode; and
      a hub controller to communicate gesture commands from a user to the gaming device console;
   an electronic circuitry operably connected to the packaging body, the electronic circuitry comprising:
      a second electrode to receive the alternating electric field emitted from the first electrode;
      a floating electrode to float the alternating electric field to the ground for forming a closed electric circuit with at least one of the gaming device console and the hub device;
      a second converter connected to the second electrode to convert the received alternating electric field into the DC energy;
      a buffer configured to store the DC energy received from the second convertor; and
      a second detection unit operative to measure the variation in the alternating electric field over the second electrode caused by touch or gestures around the packaging body or by moving the packaging body, further the second detection unit generates a unique command every time on detecting a change in electric-field percentage value for playing a game on the gaming device console;
   wherein the hub controller receives the unique command for a specified electric-field percentage value and further the hub controller facilitates in selecting the right game move for playing a game on the gaming device console.

2. The system according to claim 1 wherein the hub controller registers users associated with the packaging body.

3. The system according to claim 2 wherein the hub controller stores redeemable points and further allot the redeemable points to registered users redeemable on recycling the packaging body.

4. The system according to claim 1 wherein the hub controller identifies the registered user associated with the packaging body.

5. The system according to claim 3 wherein the hub controller further transfers the redeemable points between two registered users.

6. The system according to claim 1 wherein the second detection unit comprising:
   a first Schmitt trigger configure to generate a pulse interval signal related to variation in the alternating electric field across the second electrode;
   a second Schmitt trigger configured to generate a clock signal on receiving AC power from the second electrode;
   a counter configured to receive the pulse interval signal and the clock signal for generating a counter-value of the alternating electric field;
   a selector controls the operation of the counter to compare counter-value on receiving instructions from the second Schmitt trigger; and
   an interpreter interprets the counter-value into electric field level percentage value indication the identification-information of the electronic circuitry.

7. The system according to claim 6 wherein the electronic circuitry further comprising a modulation unit for modulating the identification-information with the alternating electric field, and further transmitting the modulated identification-information to the hub controller.

8. The system according to claim 1 wherein the electronic circuitry further comprising a microphone to communicate acoustic feedback from the user resonating over the packaging body.

9. The system according to claim 1 wherein the electronic circuitry further comprising a light emitting diode to illuminate the packaging body on receiving the store DC energy from the buffer.

10. The system according to claim 1 wherein the hub device commands the electronic circuitry to display information on a communication device.

* * * * *